United States Patent [19]

Lin

[11] Patent Number: 5,799,854

[45] Date of Patent: Sep. 1, 1998

[54] WORKPIECE FEEDING MACHINE

[76] Inventor: Ching-Chi Lin, No. 473, San-Feng Rd., Hou-Li Hsiang, Tai-Chung Hsien, Taiwan

[21] Appl. No.: 824,030

[22] Filed: Mar. 26, 1997

[51] Int. Cl.⁶ .................... B65H 20/00; B27C 1/12
[52] U.S. Cl. .................. 226/188; 144/246.1; 144/247; 226/194
[58] Field of Search .................... 226/188, 189, 226/194; 144/246.1, 247, 248

[56] References Cited

U.S. PATENT DOCUMENTS

| 79,000 | 6/1868 | Raft | 144/246.1 X |
|---|---|---|---|
| 239,497 | 3/1881 | Hermance | 226/188 |
| 940,016 | 11/1909 | Hick | 144/246.1 X |
| 1,229,987 | 6/1917 | Littleford | 144/246.1 X |
| 2,646,088 | 7/1953 | Smith | 144/247 X |
| 4,483,378 | 11/1984 | Chang et al. | 144/248.4 |

*Primary Examiner*—Michael Mansen
*Attorney, Agent, or Firm*—Christensen O'Connor Johnson & Kindness PLLC

[57] ABSTRACT

A workpiece feeding device includes a housing with a vertical support wall which has shaft mounting sleeves. First shafts extend horizontally and respectively through the sleeves. Two bearings are provided in two ends of each sleeve between the first shaft and the sleeve and are made of a powder-metallurgy process. Swing seats are mounted respectively to rear ends of the sleeves and have vertical seat walls which, in turn, have first holes for insertion of the sleeve and second holes for insertion of second shafts. Bushings project from the seat walls and have auxiliary seats which extend to the sleeves for connection therewith. As such, the machine can operate stably during the workpiece feeding operation.

2 Claims, 5 Drawing Sheets

WORKPIECE FEEDING MACHINE

BACKGROUND OF THE INVENTION

1. Field of the Invention

This invention relates to a workpiece feeding machine, more particularly to a workpiece feeding machine with a number of aligned advancing rollers to advance planer workpieces, such as wooden plates or boards, in cutting and sawing processes.

2. Description of the Related Art

In order to avoid injury to operators when feeding workpieces during wood working operations, machines have been developed to perform mechanical feeding of workpieces in place of the manual feeding operation. FIGS. 1 and 2 show a conventional workpiece feeding machine 10 to be employed on a worktable (not shown). The machine 10 is shown to include a housing 12 which has a vertical support wall 121 with three shaft mounting seats 122, and a motor 11 with a worm shaft 111 to engage a worm wheel 131 in the housing 12. A main transmission assembly 13 has a first shaft 132 which is coupled with the worm wheel 131 and two sprockets 134 at one of its ends. There are two other transmission assemblies 15, 16 which have two first shafts 152, 162 provided with two sprockets 151, 161 respectively to be chained with the sprockets 134 for synchronous rotation. The first shafts 132, 152, 162 extend through a respective one of the shaft mounting seats 122 and are journalled in first sleeves 1411 that are fitted in swing seats 141, respectively. Each of the swing seats 141 hold a respective one of three respective second shafts 142, each of which passes through a second sleeve 1412 on the corresponding swing seat 141 for carrying an advancing roller 144.

The first shaft 132 is driven by the motor 11 to rotate the chained sprockets 134, 151, 161 so as to rotate the other first shafts 152, 162, thereby rotating the second shafts 142, as well as the advancing rollers 144 which are biased downward by three torsion springs 145, to drive workpieces.

There are bearing sleeves 133 disposed between the shaft mounting seats 122 and the first shafts 132, 152, 162 respectively to avoid direct friction between the seats 122 and the shafts 132, 152, 162 and to reduce friction. However, the sleeves 133 are insufficient for bearing load and for reduction of friction. Moreover, the first shafts 132, 152, 162 tend to vibrate in the sleeves 133, thereby resulting in instability in the rate of feeding the workpieces.

As mentioned above, since the first sleeves 1411 of the swing seats 141 are pivotally sleeved on the sleeves 133, the swing seats 141 are swingably hung on the sleeves 133 so that the advancing rollers 144 are movable upward or downward according to the thickness of the workpieces while being biased downward to press the workpieces. A problem encountered with the so-arranged swing seats 141 is that they tend to incline with respect to a vertical plane and vibrate forward and backward, thereby resulting in unstable pressure on the workpieces.

SUMMARY OF THE INVENTION

The main object of the present invention is to provide a workpiece feeding machine which can operate stably during the workpiece feeding operation.

According to this invention, a workpiece feeding machine includes a housing with a vertical support wall between its front and rear ends. The vertical support wall has a plurality of shaft mounting sleeves. A plurality of first shafts extend horizontally through the shaft mounting sleeves, respectively. A plurality of swing seats are mounted respectively to rear ends of the shaft mounting sleeves. A plurality of second shafts are mounted respectively to the swing seats and extend horizontally and rearwardly. The second shafts are offset radially from the first shafts. A plurality of advancing rollers are mounted respectively to the second shafts. Torsion springs bias the advancing rollers downward. A motor is mounted to the housing. A plurality of transmission members connect the motor and the first shafts. The swing seats have vertical seat walls which have first holes for insertion of the rear ends of the shaft mounting sleeves, and second holes radially offset from the first holes for receiving the second shafts, respectively. The vertical seat walls further have bushings which are formed around the second holes and which project forwardly from the vertical seat walls to be substantially parallel with the shaft mounting sleeves. The bushings have auxiliary seats which extend to the shaft mounting sleeves for connection therewith. The auxiliary seats have connecting holes for receiving the shaft mounting sleeves forwardly of the vertical seat walls. Two bearings are provided in two ends of each sleeve between the first shaft and the sleeve and are made of a powder-metallurgy process. As such, the workpiece feeding machine can operate stably during the feeding operation.

BRIEF DESCRIPTION OF THE DRAWINGS

Other features and advantages of the present invention will become apparent in the following detailed description of a preferred embodiment of the invention, with reference to the accompanying drawings, in which.

DETAILED DESCRIPTION OF THE PREFERRED EMBODIMENT

Figure 1:
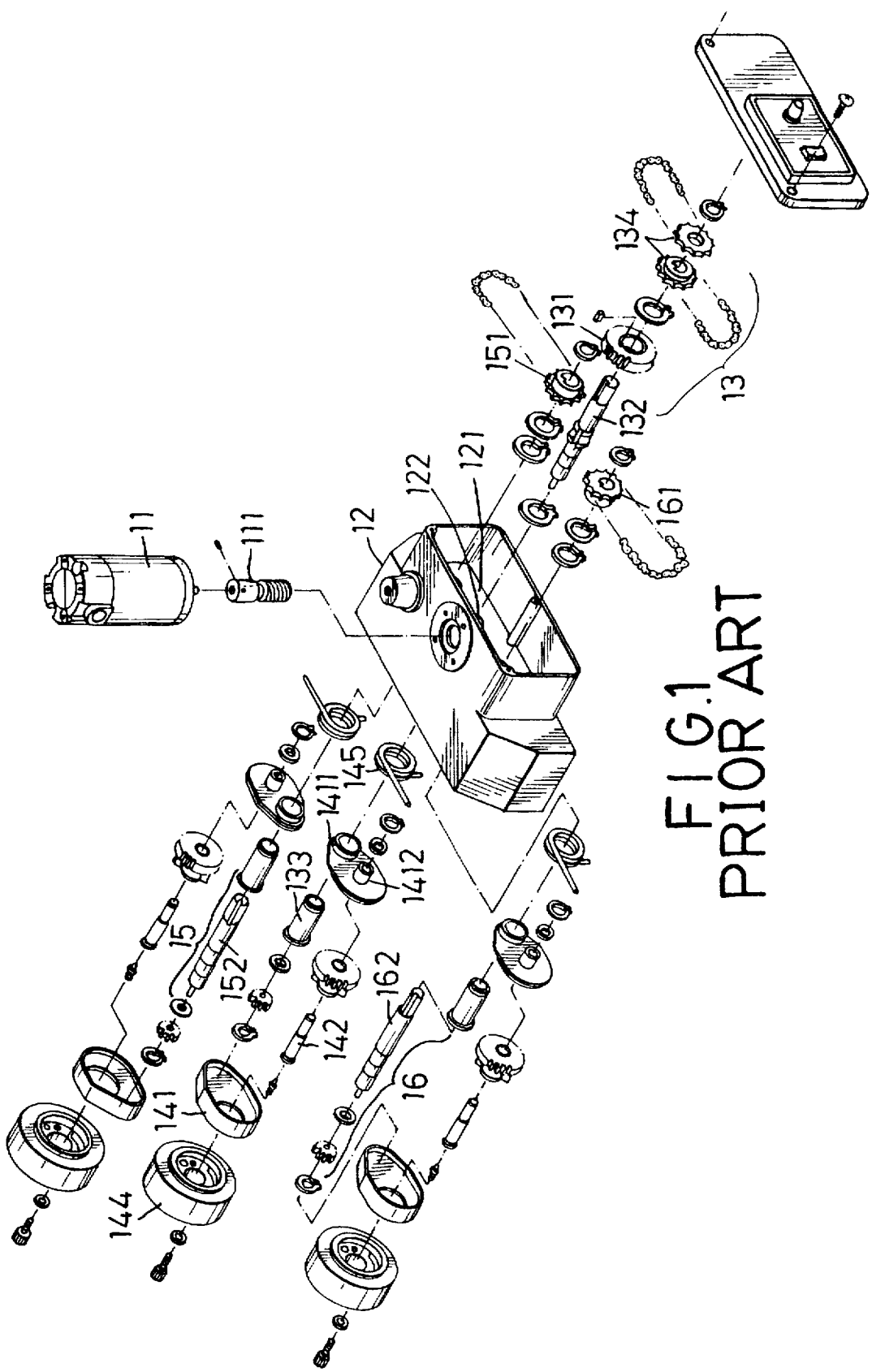
FIG. 1 is an exploded view of a conventional workpiece feeding machine.
Figure 2:
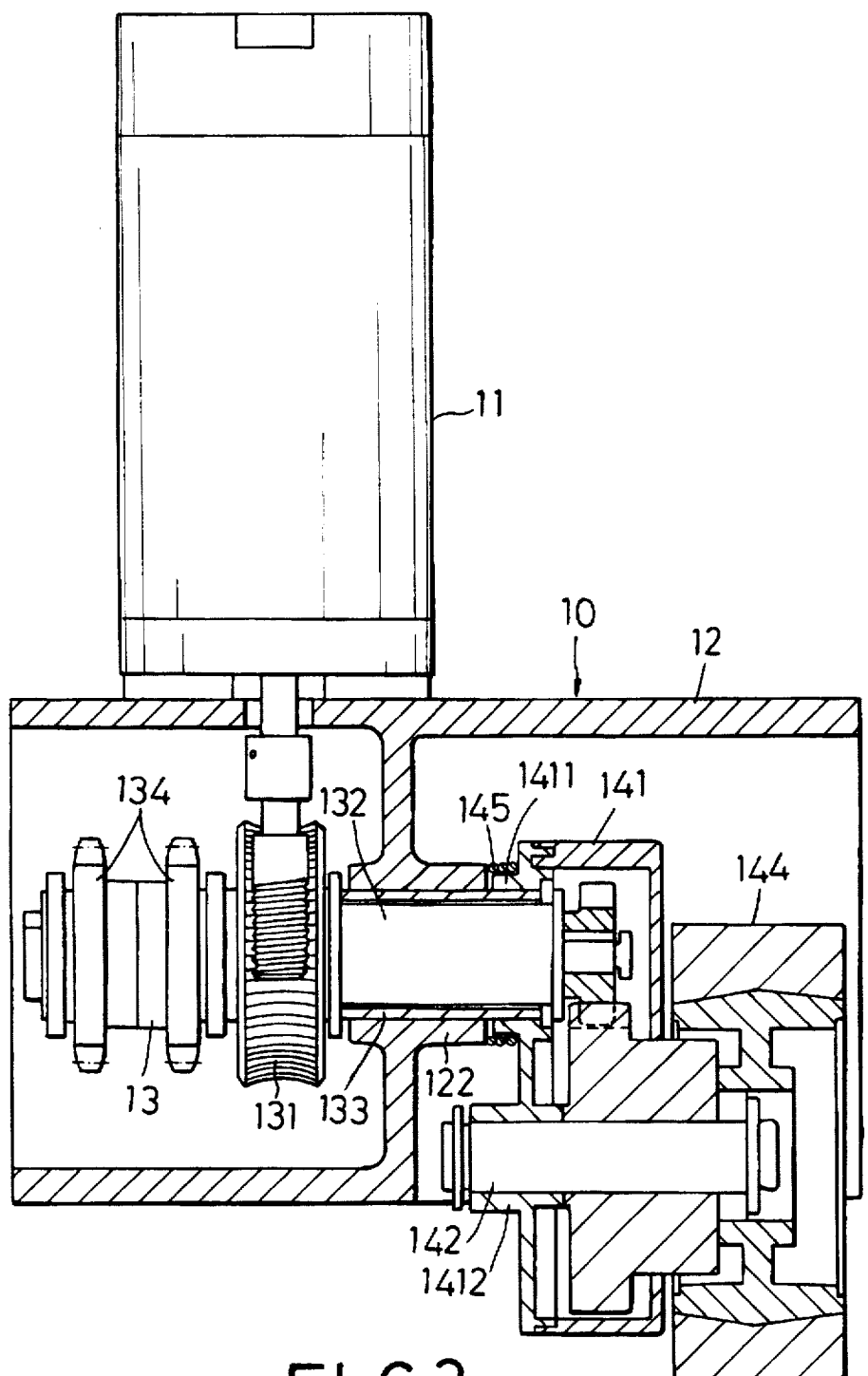
FIG. 2 is a sectional view of the conventional feeding machine.
Figure 3:
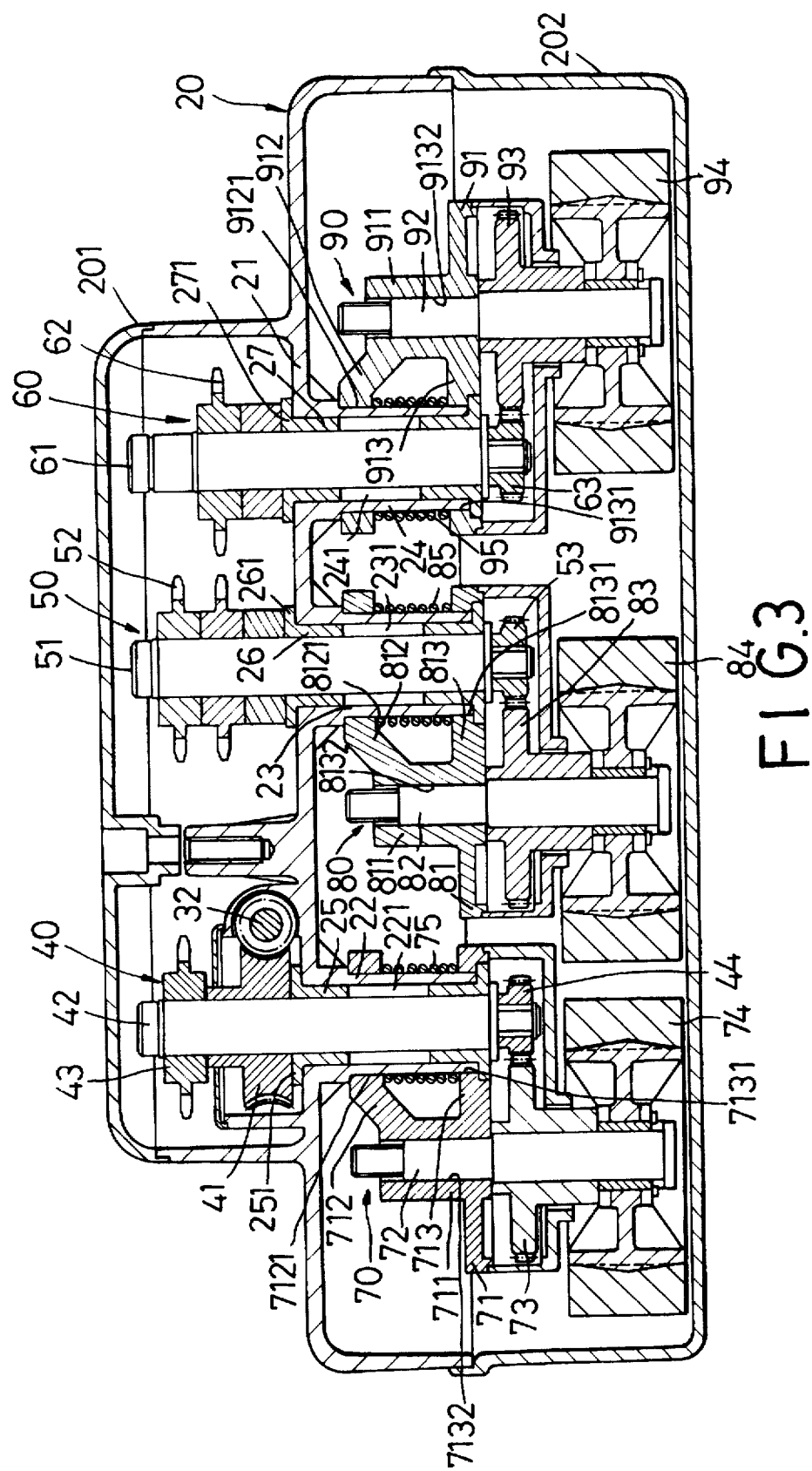
FIG. 3 is a cross-sectional plan view of a workpiece feeding machine according to a preferred embodiment of the present invention.
Figure 4:
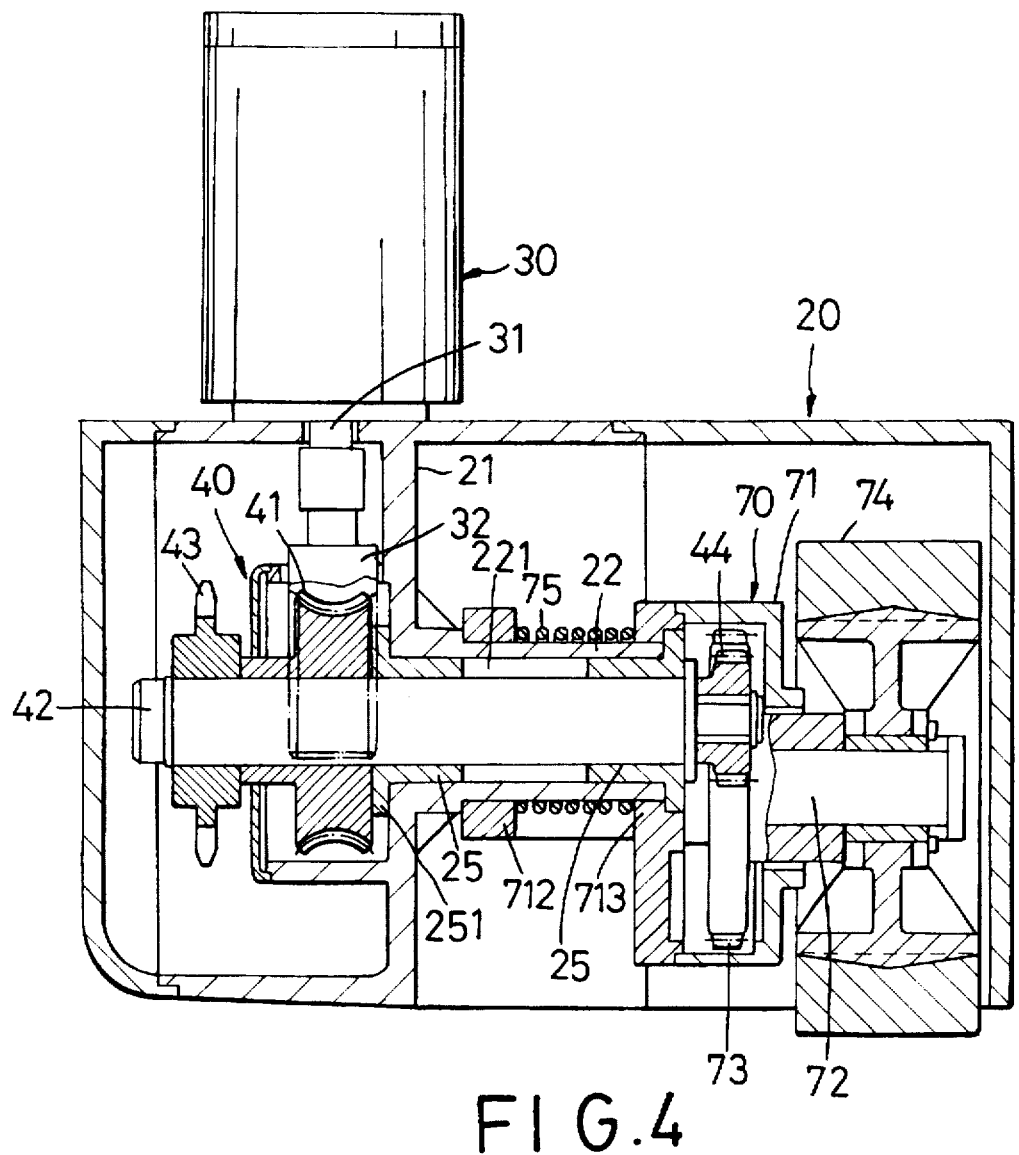
FIG. 4 is a side sectional view of the workpiece feeding machine of FIG. 3.
Figure 5:
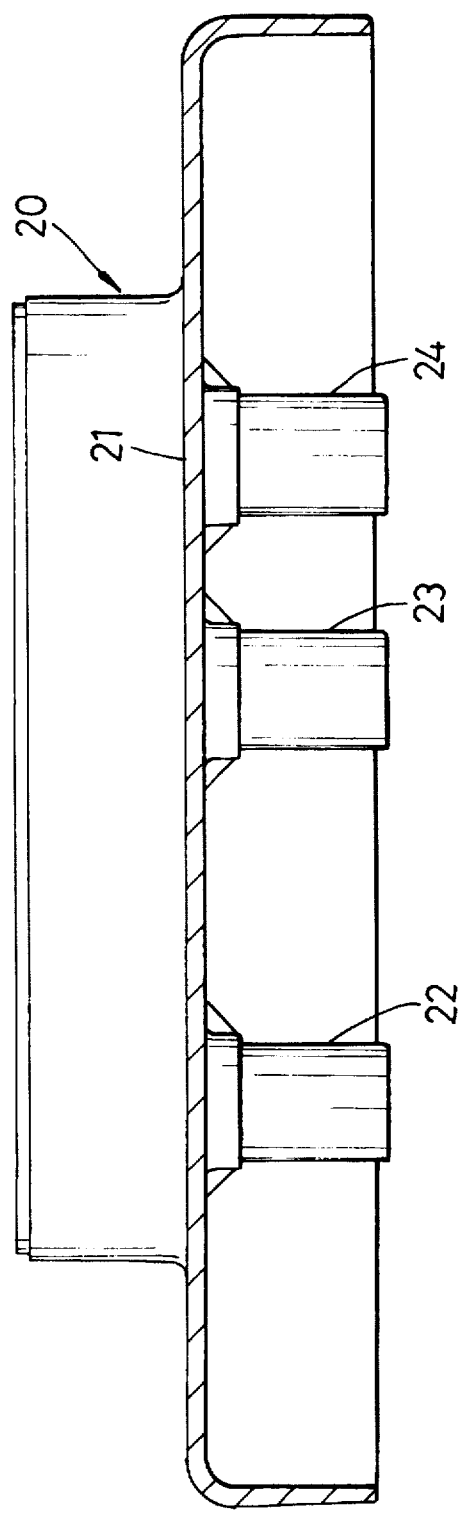
FIG. 5 is a partly sectioned view of a portion of the swing seat shown in FIG. 3.

Referring to FIGS. 3 and 4, the preferred embodiment of a workpiece feeding machine according to the present invention is shown to comprise a housing 20, a motor 30, first, second and third transmission assemblies 40, 50, 60, and first, second and third rotating assemblies 70, 80, 90.

The housing 20 has a front end 201, a rear end 202, and a vertical support wall 21 between the front and rear ends 201, 202. Three shaft mounting sleeves 22, 23, 24 are integrally formed on the wall 21 and have axial holes 221, 231, 241, respectively. Two bearings 25 or 26 or 27, which are made of a powder-metallurgy process, are respectively mounted in two ends of each of the sleeves 22 or 23 or 24. Each of the bearings 25 or 26 or 27 has a projecting flange 251 or 261 or 271 which extends outwardly of each of the sleeves 22 or 23 or 24.

As shown in FIG. 4, the motor 30 is mounted on top of the housing 20 and has a spindle 31 which is connected to a worm shaft 32 that extends into the housing 20.

The first transmission assembly 40 includes a worm wheel 41 which is driven by the worm shaft 32. The transmission assemblies 40, 50, 60 have first shafts 42, 51, 61 which extend rotatably and horizontally through the bearings 25, 26, 27 of the corresponding shaft mounting sleeves 22, 23, 24, respectively. A sprocket wheels 43, 52, 62 is mounted on the front end of the first shafts 42, 51, 61. The rear ends of the first shafts 42, 51, 61 extend out of the shaft mounting sleeves 22, 23, 24 and are coupled with small gears 44, 53, 63. The sprocket wheels 43, 52, 62 are chained together for synchronous rotation.

Each rotating assembly 70 or 80 or 90 includes a swing seat 71 or 81 or 91, a second shaft 72 or 82 or 92, a big gear 73 or 83 or 93, an advancing roller 74 or 84 or 94, and a torsion spring 75 or 85 or 95. The swing seats 71, 81, 91 are mounted to the rear ends of the shaft mounting sleeves 22, 23, 24 respectively, and have vertical seat walls 713, 813, 913 respectively. The seat walls 713, 813, 913 have first holes 7131, 8131, 9131 for insertion of the shaft mounting sleeves 22, 23, 24 respectively, and second holes 7132, 8132, 9132 radially offset from the first holes 7131, 8131, 9131, respectively. Bushings 711, 811, 911 are formed around the second holes 7132, 8132, 9132 and project forwardly from the vertical seat walls 713, 813, 913 to be in parallel with the shaft mounting sleeves 22, 23, 24, respectively. The front ends of the bushings 711, 811, 911 have auxiliary seats 712, 812, 912 which extend to the shaft mounting sleeves 22, 23, 24 for connection therewith, respectively. The auxiliary seats 712, 812, 912 have connecting holes 7121, 8121, 9121 for receiving the shaft mounting sleeves 22, 23, 24 forwardly of the vertical seat walls 713, 813, 913, respectively. The second shafts 72, 82, 92 are mounted to the swing seats 71, 81, 91 and extend horizontally and rearwardly. The second shafts 72, 82, 92 pass through the second holes 7132, 8132, 9132 to carry big gears 73, 83, 93 and the advancing rollers 74, 84, 94, respectively. The big gears 73, 83, 93 engage the small gears 44, 53, 63 for transmitting the rotational movement of the same to the rollers 74, 84, 94, respectively. The torsion springs 75, 85, 95 bias the advancing rollers 74, 84, 94 downward, respectively.

In use, the first shaft 42 is driven to rotate by the motor 30 through the worm shaft 32 and the worm wheel 41 so as to rotate the sprocket wheels 43, 52, 62 synchronously, thereby rotating the other first shafts 51, 61, the small gears 44, 53, 63, the big gears 73, 83, 93, and the advancing rollers 74, 84, 94. Since the second holes 7132, 8132, 9132 are radially offset from the first holes 7131, 8131, 9131, the second shafts 72, 82, 92 are offset radially and respectively of the first shafts 42, 51, 61. While the swing seats 71, 81, 91 are swingable, the advancing rollers 74, 84, 94 are biased downward by the torsion springs 75, 85, 95 to apply pressure on workpieces of different thicknesses.

Since the vertical support wall 21 has the shaft mounting sleeves 22, 23, 24, and the bearings 25, 26, 27 of lubricating powder metallurgy material, the friction between the first shafts 42, 51, 61 and the shaft mounting sleeves 22, 23, 24 can be reduced, and the first shafts 42, 51, 61 can rotate easily and smoothly.

In addition, because the swing seats 71, 81, 91 have auxiliary seats 712, 812, 912, they can be connected with the shaft mounting sleeve 22, 23, 24 at two points, thereby eliminating the vibration problem of the swing seats 71, 81, 91.

While the present invention has been described in connection with what is considered the most practical and preferred embodiment, it is understood that this invention is not limited to the disclosed embodiment but is intended to cover various arrangements included within the spirit and scope of the broadest interpretations and equivalent arrangements.

I claim:

1. A workpiece feeding device comprising:

a housing having a front end, a rear end, and a vertical support wall between said front and rear ends, said vertical support wall having a plurality of shaft mounting sleeves;

a plurality of first shafts extending horizontally through said shaft mounting sleeves, respectively;

a plurality of swing seats mounted respectively to rear ends of said shaft mounting sleeves;

a plurality of second shafts respectively mounted to said swing seats and extending horizontally and rearwardly, said second shafts being offset radially from said first shafts respectively;

a plurality of advancing rollers mounted respectively to said second shafts;

means for biasing said advancing rollers downward;

a motor mounted to said housing; and transmission means in connection with said motor and said first shafts;

wherein each of said swing seats has a vertical seat wall which has a first hole for insertion of one of said rear ends of said shaft mounting sleeves and a second hole radially offset from said first hole for receiving one of said second shafts, said vertical seat wall further having a bushing which is formed around said second hole and which projects forwardly from said vertical seat wall to be substantially parallel with said one shaft mounting sleeve, said bushing having a front end and an auxiliary seat portion which extends from said front end to said one shaft mounting sleeve for connection therewith, said auxiliary seat portion having a connecting hole for receiving said one shaft mounting sleeve forwardly of said vertical seat wall.

2. A device as claimed in claim 1, further comprising a first bearing member and a second bearing member provided, respectively, in said vertical support wall and said vertical seat wall between each of said first shafts and the respective one of said shaft mounting sleeves, said first and second bearing members being made of a powder-metallurgy process.

* * * * *